United States Patent [19]

Stern et al.

[11] 4,180,488

[45] Dec. 25, 1979

[54] STORAGE-STABLE LACQUER RESINS

[75] Inventors: Gerhard Stern; Wilhelm Dobramysl, both of Linz, Austria

[73] Assignee: Chemie Linz Aktiengesellschaft, Linz, Austria

[21] Appl. No.: 933,926

[22] Filed: Aug. 15, 1978

[30] Foreign Application Priority Data

Aug. 23, 1977 [DE] Fed. Rep. of Germany ....... 2737984

[51] Int. Cl.² .......................... C09D 3/52; C09D 3/66; C09D 3/81
[52] U.S. Cl. ...................... 260/21; 525/163; 525/510
[58] Field of Search .......... 260/21, 834, 856; 544/196

[56] References Cited

U.S. PATENT DOCUMENTS

| | | | |
|---|---|---|---|
| 3,719,725 | 3/1973 | Murakami et al. | 260/834 |
| 3,806,508 | 4/1974 | Weinrotter et al. | 544/196 |
| 3,894,993 | 7/1975 | Blank | 260/856 |
| 3,922,447 | 11/1975 | Isaksen et al. | 260/856 |
| 3,928,265 | 12/1975 | Dhein et al. | 260/21 |
| 3,943,187 | 3/1976 | Wu | 260/834 |
| 4,038,225 | 7/1977 | Takaya et al. | 260/21 |

FOREIGN PATENT DOCUMENTS

| | | | |
|---|---|---|---|
| 144710 | 8/1948 | Australia | 544/196 |
| 158677 | 1/1952 | Australia | 544/196 |
| 258436 | 11/1967 | Austria . | |
| 313437 | 2/1974 | Austria . | |
| 648481 | 1/1951 | United Kingdom | 544/196 |
| 653520 | 5/1951 | United Kingdom | 544/196 |

*Primary Examiner*—Ronald W. Griffin
*Attorney, Agent, or Firm*—Ladas, Parry, Von Gehr, Goldsmith & Deschamps

[57] ABSTRACT

A storage-stable lacquer resin which can be baked without yellowing at a low baking temperature, and is based on an alkyd resin, acrylic resin or epoxy resin, is obtained by reacting the resin with a bis- or tris-alkoxyalkylamino-s-triazine which has been obtained by heating a triazine derivative of the general formula:

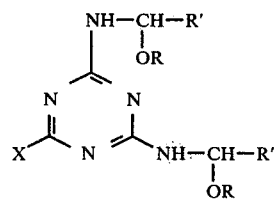

wherein X is an alkyl group having 1 to 4 carbon atoms, a phenyl group or the group

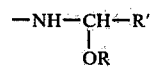

and each of R and R' is an alkyl group radical having up to six carbon atoms, at 100° to 200° C. up to a weight loss of 3 to 25%, preferably 5 to 15%.

7 Claims, No Drawings

STORAGE-STABLE LACQUER RESINS

BACKGROUND OF THE INVENTION

This invention relates to the preparation of storage-stable lacquer resins which can be baked without yellowing.

When the reaction products of amino-s-triazines, such as, for example, melamine or alkylguanamines and arylguanamines with relatively long-chain aldehydes, such as n-butanal or i-butanal, such as disclosed, for example, in U.S. Pat. No. 3,806,508, are used as a component of baking lacquers based on alkyd resins, they impart to these resin systems valuable properties, such as, for example, good storage stability, a high reactivity and a low baking temperature. However, such prior art lacquer resins composed of melamine components and alkyd components suffer from the disadvantage that they tend to discolor or to yellow at the required baking temperature or just above these, so that it has not been possible in the past to obtain pure white or light color shades which remain true to color using these surface lacquers. Hitherto, successful measures to avoid this quality defect have not been disclosed.

Surprisingly, it has now been found that the undesirable yellowing effect may be avoided without impairing the above-mentioned good properties, when the tris- or bis-alkoxyalkylamino-s-triazine is subjected to a thermal treatment before it is reacted with the alkyd resin component, acrylic resin component or epoxy resin component to give the lacquer resin. In this thermal treatment of the triazine derivative, either the solid powdered product or a suspension in a suitable solvent, if necessary under pressure, is heated. Under certain circumstances, heating of the solid may be carried out in an inert gas stream or in vacuo.

SUMMARY OF THE INVENTION

Accordingly, the present invention provides a process for the preparation of a storage-stable lacquer resin which can be baked without yellowing and which has a high reactivity, a good solubility in organic solvents and a low viscosity in solution and is based on the reaction product of an alkyd resin, acrylic resin or epoxy resin with a bis- or tris-alkoxyalkylamino-s-triazine, which comprises using a bis- or tris-alkoxyalkylamino-s-triazine which has been obtained from a triazine derivative of the general formula:

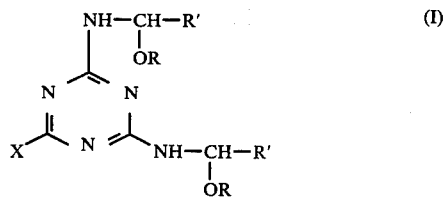

wherein X is an alkyl group having one to four carbon atoms, a phenyl group or the group

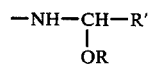

and each of R and R' is an unbranched or branched alkyl group having up to six carbon atoms, by heating for a period of 3 to 300 minutes at a temperature of 100° to 200° C., up to a weight loss of 3% to 25%, preferably 5 to 15%, relative to the dry weight of the starting triazine compound.

During the heating process according to the invention, significant amounts of volatile products, such as, for example, alcohol and a little aldehyde, are eliminated. Relative to the solids fraction, the eliminated volatile fraction must be 3 to 25%, preferably from 5 to 15% by weight. The elimination of a certain minimum amount of volatile matter is essential for success; however, exceeding the upper limit may have an adverse effect on the yellowing behavior. The optimum conditions for the thermal treatment according to the invention depend upon the nature of the alkyl and alkoxy substituents on the amino-s-triazine of the formula I and may be determined readily from a preliminary experiment.

DETAILED DESCRIPTION OF THE INVENTION

The aminotriazine derivative of formula I which may be prepared in a known manner (see U.S. Pat. No. 3,806,508) may be isolated as a solid, before the thermal treatment, by crystallization or evaporation of the reaction mixture. However, the thermal treatment also may be integrated into the preparation of the resin product without isolation of the reaction products. Thus, for example, the solid product may be heated in a solvent, preferably, in a customary lacquer solvent, such as, for example, a $C_1$–$C_4$ alkanol, an acetate of a $C_3$–$C_6$ alkanol or an alkylated benzene. If the solvent used boils below the desired treatment temperature, the treatment is carried out under elevated pressure. For example, a pressure from 1 to 10 bars may be applied. It is also possible to add the solvent after the end of the reaction, to distill off the excess volatile fractions of the reaction mixture and also the water formed and then to carry out the heat treatment by raising the temperature, if necessary, under pressure. Furthermore, the solid product may be thermally treated below or above its melting point, but within the temperature range according to the invention, under certain circumstances with the application of an inert gas or a vacuum.

Together with film-forming agents, such as, for example, alkyd resins, acrylic resins or epoxy resins, the products obtained according to the invention provide high-quality lacquers which are free from yellowing, are storage-stable, are highly reactive and can be baked at a low temperature and which can be used, as desired, either in solution in customary lacquer solvents or in solvent-free lacquer systems, for example as baking lacquers in the form of a powder.

The lacquers obtained by using the triazine derivatives according to the invention as a lacquer component, together with an alkyd resin, acrylic resin or epoxy resin, are distinguished, for example, compared with hitherto customary alkoxymelamine/formaldehyde resins, by a higher storage-stability, a lower viscosity of solutions of the same solids content and improved lacquer properties. Examples of individual tris- or bis-alkoxyalkylamino-s-triazines of formula I, which are employed in the process according to the invention and which have been prepared according to U.S. Pat. No. 3,806,508, were obtained under the reaction conditions indicated:

N,N',''-Tris-(methoxy-i-butyl)-melamine from 1 mole of melamine, 12.5 moles of isobutyraldehyde, 22.5 moles of methanol and 3.0 g. of p-toluenesulfonic acid as the catalyst, with boiling for two hours under reflux.

N,N'N''-Tris-(i-butoxy-i-butyl)-melamine from 1 mole of melamine, 12.5 moles of isobutyraldehyde, 20 moles of isobutanol and 3.0 g. of p-toluenesulfonic acid, with boiling for two hours under reflux.

N,N'N''-Tris-(n-butoxy-i-butyl)-melamine from 1 mole of melamine, 12.5 moles of isobutyraldehyde, 22.5 moles of n-butanol and 3.0 g. of p-toluenesulfonic acid as the catalyst, with boiling for 3 hours under reflux.

N,N',N''-Tris-(methoxy-n-butyl)-melamine from 1 mole of melamine, 8 moles of n-butyraldehyde, 20 moles of methanol and 3.0 g. of p-toluenesulfonic acid as the catalyst, with boiling for 2 hours under reflux.

N,N',N''-Tris-(i-butoxy-n-butyl)-melamine from 1 mole of melamine, 12.5 moles of n-butyraldehyde, 20 moles of i-butanol and 3.0 g. of p-toluenesulfonic acid as the catalyst, with boiling for 2 hours under reflux.

N,N',N''-Tris-(isobutoxy-n-propyl)-melamine from 1 mole of melamine, 9 moles of n-propionaldehyde, 18 moles of i-butanol and 3.0 g of p-toluenesulfonic acid as the catalyst, with boiling for 2 hours after reflux.

N,N',N''-Tris-(n-butoxy-n-butyl)-melamine from 1 mole of melamine, 12.5 moles of n-butyraldehyde, 20 moles of n-butanol and 3.0 g. of p-toluenesulfonic acid as the catalyst, with boiling for 2 hours under reflux.

N,N',N''-Tris-(methoxy-n-propyl)-melamine from 1 mole of melamine, 6 moles of n-propionaldehyde, 18 moles of methanol and 2.5 g. of p-toluenesulfonic acid as the catalyst, with boiling for two hours at 65° under reflux.

N,N',N''-Tris-(i-butoxy-ethyl)-melamine from 1 mole of melamine, 9 moles of acetaldehyde, 18 moles of i-butanol and 3.0 g. of p-toluenesulfonic acid as the catalyst, with boiling for 4 hours at 51° to 62° C.

N,N',N''-Bis-(methoxy-i-butyl)benzoguanamide from 1 mole of benzoguanamine, 4 moles of i-butyraldehyde, 18 moles of methanol and 2.5 g. of p-toluenesulfonic acid as the catalyst, with boiling for one hour at 65° C.

N,N'-Bis-(methoxy-i-butyl)-acetoguanamine from 1 mole of acetoguanamine, 8 moles of i-butyraldehyde, 18 moles of methanol and 2.5 g. of p-toluenesulfonic acid as the catalyst, with boiling for 2 hours at 64° C.

The process according to the invention is illustrated in more detail in the Examples which follow.

EXAMPLE 1

Thermal treatment in the solid state

After drying in vacuo at 50° C., N,N',N''-tris-(methoxy-i-butyl)-melamine is heated for a total period of 125 minutes at a temperature of 140° C. under a pressure of 1 bar. Relative to the raw material employed, the weight loss found is 3.6% after 45 minutes, 4.5% after 80 minutes and finally 6.2% after 125 minutes. At each of these time stages, samples were taken and used for the preparation of lacquer resins.

A 50% strength solution of these three substances in n-butanol is mixed with a commercially available alkyd resin which contains 30% of castor oil and has an acid number of 20 to 30, in such a way that the solids ratio is 30 parts by weight of triazine derivative: 70 parts by weight of alkyd resin. One gram of this lacquer is applied to a white, glazed, 20 cm² plate and is baked for 30 minutes at 125° C. As a blank, a sample is prepared using a commercially available, highly reactive melamine/-formaldehyde resin (55% strength by weight solution in butanol) (Comparison 1). The color difference between the Comparison 1 and the sample was assessed visually; if the sample has the same appearance as the Comparison 1, it is given the rating 1, and if the sample is better, it is given the rating 0. However, the Comparison 2, which was prepared from a triazine derivative which had not been thermally treated, and which was strongly yellowing, was given the rating 5.

The following evaluation is determined for the 3 samples obtained after the above heating times:

TABLE 1

| No. | % decrease in weight | Duration of heating at 140° C. | Rating |
|---|---|---|---|
| 1 | 3.6 | 45 minutes | 2 |
| 2 | 4.5 | 80 minutes | 1 |
| 3 | 6.2 | 125 minutes | 0 |

EXAMPLE 2

Thermal treatment in the molten state

The substances listed in Table 2 which follows are prepared as indicated above and are obtained in the solid form, after crystallization and drying at 50° C. in vacuo. Moreover, in some cases, the solid is prepared directly by evaporating the reaction solution. A part of the powders in each case is heated for 10 minutes at 160° C., clear melts being obtained. The samples thus prepared are dissolved in n-butanol so that 60% strength solutions are formed. Lacquer resins are prepared from the latter as in Example 1 and are tested; however, they were baked for 60 minutes at 100° C. The results of the assessment, carried out as in Example 1, are summarized in Table 2 which follows.

TABLE 2

| Starting compound for the after-treatment | Assessment | |
|---|---|---|
| | crystallized | evaporated |
| N,N',N''-Tris-(methoxy-i-butyl)-melamine | 0 | 1 |
| N,N',N''-Tris-(i-butoxy-i-butyl)-melamine | 1 | 2 |
| N,N',N''-Tris-(n-butoxy-i-butyl)-melamine | — | 2 |
| N,N',N''-Tris-(methoxy-n-butyl)-melamine | 1 | — |
| N,N',N''-Tris-(i-butoxy-n-butyl)-melamine | 1 | — |
| N,N',N''-Tris-(n-butoxy-n-butyl)-melamine | 1 | 1 |
| N,N',N''-Tris-(isobutoxy-n-propyl)-melamine | 1 | — |
| N,N',N''-Tris-(methoxy-n-propyl)-melamine | 1 | — |
| N,N',N''-Tris-(i-butoxy-ethyl)-melamine | 1 | — |
| N,N'-Bis-(methoxy-i-butyl)-benzoguanamine | 2 | — |
| N,N'-Bis-(methoxy-i-butyl)-acetoguanamine | 0 | — |

EXAMPLE 3

Solid, dry N,N',N''-tris-(methoxy-isobutyl)-melamine is introduced into a vessel pre-heated to 180° C., the melting process starting immediately. The material is held at this temperature for 3, 4 and 5 minutes, weight losses, relative to the weight of the product employed, of 4.7%, 7.5 and 9% respectively being found. According to the comparison test, as described in Example 1, the samples taken after the above time stages were given the ratings 1, 1 and 0 respectively.

EXAMPLE 4

Thermal treatment in the dissolved state

A reaction batch of N,N',N''-tris-(methoxy-i-butyl)-melamine, prepared under the conditions indicated above, is evaporated to half its volume, 250 g. of n-butanol are added and the residual isobutyraldehyde, methanol and water of reaction as well as a quantity of butanol such that the desired concentration (preferably 50 to 80%) is reached, are then distilled off. The temperature is now raised to 150° C. and held at this value for 3 hours. The pressure in the reaction vessel rises to 6 to 7 bars, the weight loss, relative to dry solids, is 7% and the batch is then cooled. A clear solution of relatively low viscosity is obtained. For example, the flow time, determined using a DIN cup 4, according to DIN 53,211, of a 70% strength solution thus obtained is 48 seconds.

This solution was tested in accordance with the procedure of Example 2 and gave the rating 0.

EXAMPLE 5

Solid, N,N',N''-tris-(methoxy-n-butyl)-melamine was obtained, by crystallization, filtration and drying at 50° C., in vacuo from a batch for the preparation of N,N',N''-tris-(methoxy-n-butyl)-melamine. 40 g. of the product are then heated together with 60 g. of n-butanol for two hours under reflux, a clear, colorless solution being formed. The yellowing test, according to Example 1, gives the rating 1.

EXAMPLE 6

Solid, N,N',N''-tris-(i-butoxy-i-butyl)-melamine is produced and analogously to Example 5. 40 g. thereof are heated together with 60 g. of xylene for 30 minutes under reflux, a clear, colorless solution being formed. The yellowing test, according to Example 1, gives the rating 0.

EXAMPLE 7

A commercially available acrylic resin (acid number 8 to 12) which crosslinks with other components and which is in the form of a 50% strength by weight solution in butanol/xylene, is mixed with the thermally treated N,N',N''-tris-(methoxy-i-butyl)-melamine according to Example 4 in a ratio of 8:2 and the test lacquer surface produced with this is baked for 30 minutes at 125° C.

Colorless coatings are obtained which have a high gloss and a yellowing rating of 0.

EXAMPLE 8

A commercially available, low molecular weight epoxy resin, which is in the form of a 50% strength by weight solution in butanol/xylene, is mixed with the thermally treated N,N',N''-tris-(methoxy-i-butyl)-melamine according to Example 4 in a ratio of 8:2 and the test lacquer surface produced with this is baked for 60 minutes at 100° C. Very hard yet elastic coatings are obtained.

EXAMPLE 9

Preparation of a baking lacquer

The following components were used:

1. N,N',N''-Tris-(methoxy-i-butyl)-melamine, treated in accordance with the invention, in the form of a solution in n-butanol, prepared according to Example 4.

| | |
|---|---|
| Non-volatile on stoving (approx.) (1 hour, 90° C., 1 g/100 cm$^2$) | 55% |
| Non-volatile on stoving (approx.) (1 hour, 125° C., with n-butanol 1:1, 4 g/100 cm$^2$ thereof) | 50% |
| Color number (DIN 53,403) | <1 |
| Acid number | <2 |

Flow time, using a DIN cup 4, according to DIN 53,211, 21 seconds.

2. The alkyd resin used is a commercially available alkyd resin (acid number 20 to 30) which contains 30% of castor oil and which is recommended by the manufacturer for baking lacquers with a baking temperature from 80° C. upwards, and is employed as a 60% strength by weight solution in butanol/xylene.

3. The white pigment used is a titanium dioxide pigment (rutile).

8 parts by weight of the treated N,N',N''-tris-(methoxy-i-butyl)-melamine, characterized in Component 1, are processed with 32 parts by weight of the alkyd resin and 25 parts by weight of the titanium dioxide pigment in a 60% strength by weight solution in butanol/xylene. The lacquer is then applied to a steel sheet of 0.8 mm thickness and baked for 15 minutes at 120° C. The dry film thickness is 40 μm.

The lacquer film obtained in this manner shows a pendulum hardness, according to DIN 53,157, of 102 seconds, a distensibility, according to DIN 53,136, of 8 mm, a gloss, according to ASTM-D 523-72, of 94 and a good resistance to aromatics (xylene). No yellowing whatsoever is observable.

We claim:

1. In a process for the preparation of a storage-stable lacquer resin which can be baked without yellowing and which has a high reactivity, a good solubility in organic solvents and a low viscosity in solution and is based on the reaction product of an alkyd resin, acrylic resin or epoxy resin with a bis- or tris-alkoxyalkylamino-s-triazine, the improvement which comprises using a bis- or tris-alkoxyalkylamino-s-triazine which has been obtained from a triazine derivative of the general formula:

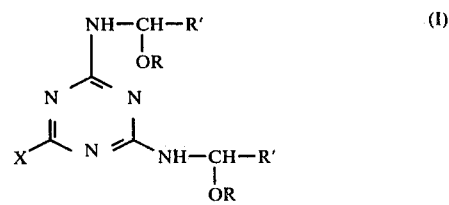

wherein X is an alkyl group having one to four carbon atoms, a phenyl group or the group

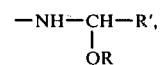

and each of R and R' is an unbranched or branched alkyl group having up to six carbon atoms, by heating for a period of 3 to 300 minutes at a temperature of 100° to 200° C., up to a weight loss of 3% to 25%, relative to the dry weight of the triazine starting compound.

2. A process according to claim 1, in which the triazine derivative of formula I is heated to a weight loss of 5 to 15%.

3. A process according to claim 1, in which the heating of the triazine derivative of formula I is carried out in a solvent.

4. A process according to claim 3, in which the boiling point of the solvent is below the heating temperature, and the heating is carried out under elevated pressure.

5. A process according to claim 4, in which the crude reaction solution obtained in the preparation of the triazine derivative of formula I is subjected to the said heating treatment without isolation.

6. A process according to claim 1, in which triazine derivatives of formula I is heated in the solid or molten state.

7. A process according to claim 6, in which the heating is effected in an inert gas atmosphere or in vacuo.

* * * * *